US012036653B2

(12) United States Patent
Eardley

(10) Patent No.: US 12,036,653 B2
(45) Date of Patent: Jul. 16, 2024

(54) IMPACT TOOL ANVIL HAVING A TRANSITION REGION WITH MULTIPLE ATTRIBUTES

(71) Applicant: Ingersoll-Rand Industrial U.S., Inc., Davidson, NC (US)

(72) Inventor: Edward Charles Eardley, Easton, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 17/199,990

(22) Filed: Mar. 12, 2021

(65) Prior Publication Data

US 2021/0283757 A1 Sep. 16, 2021

Related U.S. Application Data

(60) Provisional application No. 62/988,715, filed on Mar. 12, 2020.

(51) Int. Cl.

*B25D 9/04* (2006.01)
*B25D 17/06* (2006.01)
*B25D 17/00* (2006.01)

(52) U.S. Cl.

CPC ............... *B25D 17/06* (2013.01); *B25D 9/04* (2013.01); *B25D 17/005* (2013.01); *B25D 2217/0003* (2013.01); *B25D 2217/0015* (2013.01); *B25D 2250/051* (2013.01); *B25D 2250/095* (2013.01)

(58) Field of Classification Search

CPC ........ B25D 9/04; B25D 17/005; B25D 17/06; B25D 2217/0003; B25D 2217/0015; B25D 2250/051; B25D 2250/095; B25B 21/02; B25B 23/0035

USPC ........................................................... 173/90

See application file for complete search history.

(56) References Cited

U.S. PATENT DOCUMENTS 3,156,334 A * 11/1964 Hoza ...................... B25B 21/02 192/113.1
3,174,597 A * 3/1965 Schaedler .............. B25B 21/02 74/56
5,038,869 A * 8/1991 Olson ....................... F16D 1/06 81/177.85

(Continued)

FOREIGN PATENT DOCUMENTS

EP 1579958 A1 * 9/2005 ........... B25B 15/001

*Primary Examiner* — Thanh K Truong
*Assistant Examiner* — David G Shutty
(74) *Attorney, Agent, or Firm* — Kevin E. West; Advent, LLP

(57) ABSTRACT

Systems and methods for management of material stresses present at transitions between facets of an anvil and the anvil shaft are described. In one aspect, an apparatus includes an impact tool anvil extending along an axis of extension and having a faceted drive end and a shaft body which is connected to the faceted drive end through a transition region that couples respective faces of the faceted drive end to the shaft body, the transition region including a sweeping radius surface having a first axial end and a second axial end, the first axial end connected to a respective face of the faceted drive end, the first axial end having a tangency with the respective face of the faceted drive end; and an angular transition having a slope that radially rises from the second axial end of the sweeping radius surface to the shaft body.

9 Claims, 5 Drawing Sheets

(56) References Cited

U.S. PATENT DOCUMENTS

| | | | | | |
|---|---|---|---|---|---|
| 5,083,619 | A * | 1/1992 | Giardino | B25B 21/02 | 173/104 |
| 6,227,308 | B1 * | 5/2001 | Ghode | B25B 21/02 | 173/93.5 |
| D469,673 | S * | 2/2003 | Sliker | B25D 17/005 | D8/68 |
| 6,938,526 | B2 * | 9/2005 | Milbourne | B25B 21/02 | 81/177.85 |
| 7,036,406 | B2 * | 5/2006 | Milbourne | B25B 21/026 | 81/177.85 |
| 7,083,003 | B1 * | 8/2006 | Pusateri | B25D 17/005 | 173/132 |
| 7,207,393 | B2 * | 4/2007 | Clark, Jr. | B25B 23/0035 | 173/90 |
| 7,249,638 | B2 * | 7/2007 | Bodine | B25B 21/02 | 173/171 |
| 7,980,321 | B2 * | 7/2011 | Happ | B25B 21/023 | 173/128 |
| 8,074,732 | B2 * | 12/2011 | Lehnert | B25B 23/0035 | 173/132 |
| 8,141,654 | B2 * | 3/2012 | Lin | B25B 21/02 | 173/104 |
| 8,342,061 | B2 * | 1/2013 | Super | B25B 15/001 | 81/177.85 |
| 8,839,879 | B2 * | 9/2014 | Elger | B25D 17/005 | 173/132 |
| 9,669,526 | B2 * | 6/2017 | Ely | B25B 23/0035 | |
| 10,850,371 | B2 * | 12/2020 | Xu | B25D 17/06 | |
| 11,433,514 | B2 * | 9/2022 | Hsieh | B25B 23/0035 | |
| 2003/0056625 | A1 * | 3/2003 | Bizilia | B25B 21/02 | 81/177.85 |
| 2005/0161243 | A1 * | 7/2005 | Livingston | B25B 21/02 | 173/171 |
| 2013/0228356 | A1 * | 9/2013 | Hayes | B23P 15/00 | 173/90 |
| 2015/0000946 | A1 * | 1/2015 | Amend | B25B 21/026 | 173/93 |
| 2018/0029205 | A1 * | 2/2018 | Livingston | B25B 21/02 | |
| 2019/0375085 | A1 * | 12/2019 | Chen | B25D 16/00 | |
| 2020/0001440 | A1 * | 1/2020 | Lee | B25B 21/002 | |
| 2020/0215667 | A1 * | 7/2020 | Tamura | B25B 21/026 | |
| 2021/0283757 | A1 * | 9/2021 | Eardley | B25B 21/026 | |

* cited by examiner

IMPACT TOOL ANVIL HAVING A TRANSITION REGION WITH MULTIPLE ATTRIBUTES

CROSS-REFERENCE TO RELATED APPLICATIONS

The present application claims the benefit under 35 U.S.C. § 119(e) of U.S. Provisional Application Ser. No. 62/988,715, filed Mar. 12, 2020, and titled IMPACT TOOL ANVIL HAVING A TRANSITION REGION WITH MULTIPLE ATTRIBUTES. U.S. Provisional Application Ser. No. 62/988,715 is herein incorporated by reference in its entirety.

BACKGROUND

Impact tool anvils can provide an interface between an impact tool hammer and a socket for application of torque to a fastener. During operation of the impact tool, stresses can develop in the impact tool anvil due to interaction with the socket and the hammer. As the stresses increase, the impact tool anvil can degrade or otherwise weaken, which can affect an effective operating life of the impact tool or portions thereof.

SUMMARY

Systems and methods for management of material stresses present at transitions between facets of an anvil and the anvil shaft are described. In one aspect, an apparatus includes, but is not limited to, an impact tool anvil extending along an axis of extension and having a faceted drive end and a shaft body which is connected to the faceted drive end through a transition region that couples respective faces of the faceted drive end to the shaft body, the transition region including a sweeping radius surface having a first axial end and a second axial end, the first axial end connected to a respective face of the faceted drive end, the first axial end having a tangency with the respective face of the faceted drive end; and an angular transition having a slope that radially rises from the second axial end of the sweeping radius surface to the shaft body.

In one aspect, a method for shaping an impact tool anvil includes, but is not limited to, turning a prefinished impact tool anvil to produce a transition section characterized by a reduction in cross sectional area from a first end to a second end, the transition section extending between a shaft section and a drive end section; creating a plurality of faceted sides into the drive end section; machining a plurality of sweeping radius surfaces corresponding to the number of the plurality of faceted sides, the plurality of sweeping radius surfaces located between the second end of the transition section and an intermediate region between the second end and the first end; as a result of the creating and machining, forming a smooth transition between each of the plurality of sweeping radius surfaces and the plurality of faceted sides; forming a plurality of angular transition surfaces that extend from each intermediate point corresponding to each of the plurality of sweeping radius surfaces to the first end of the transition section.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. In the figures, the use of the same reference numbers in different instances in the description and the figures may indicate similar or identical items.

DETAILED DESCRIPTION

Figure 1:
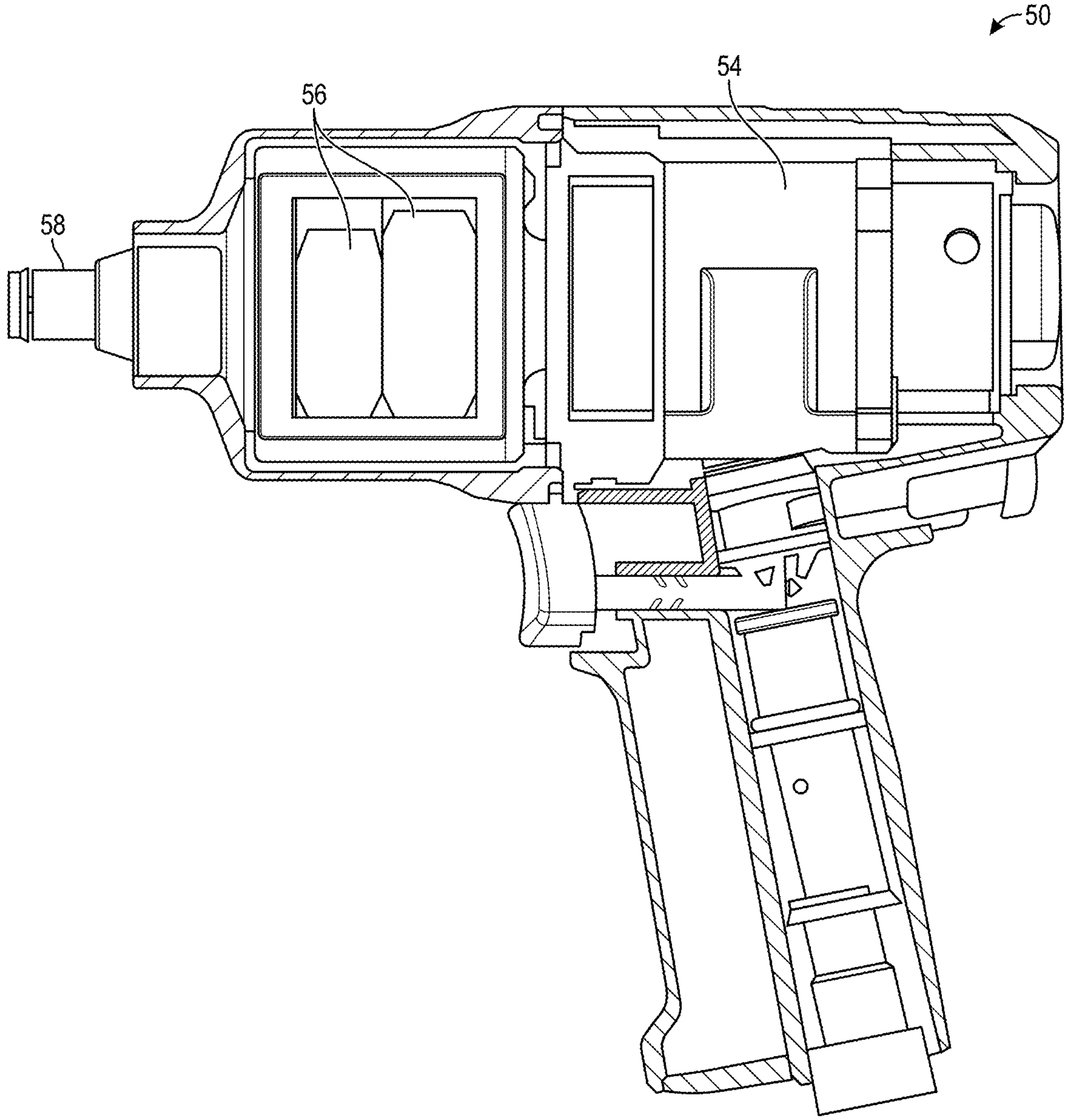
FIG. 1 is a side elevation view of an embodiment of an impact tool.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, one embodiment of an impact tool 50 is illustrated in the form of a pneumatically driven impact tool which includes a motor 54 located within an outer housing of the impact tool 50. The motor 54 is connected either directly or through suitable interconnection, such as a gear train, to a hammer 56 structured to deliver impact loads to an impact tool anvil 58. Although the illustrated embodiment is depicted relative to a pneumatically-driven impact tool, other forms can include electrically-driven or hydraulically-driven impact tools with associated internal motor and hammer.

Figure 2:
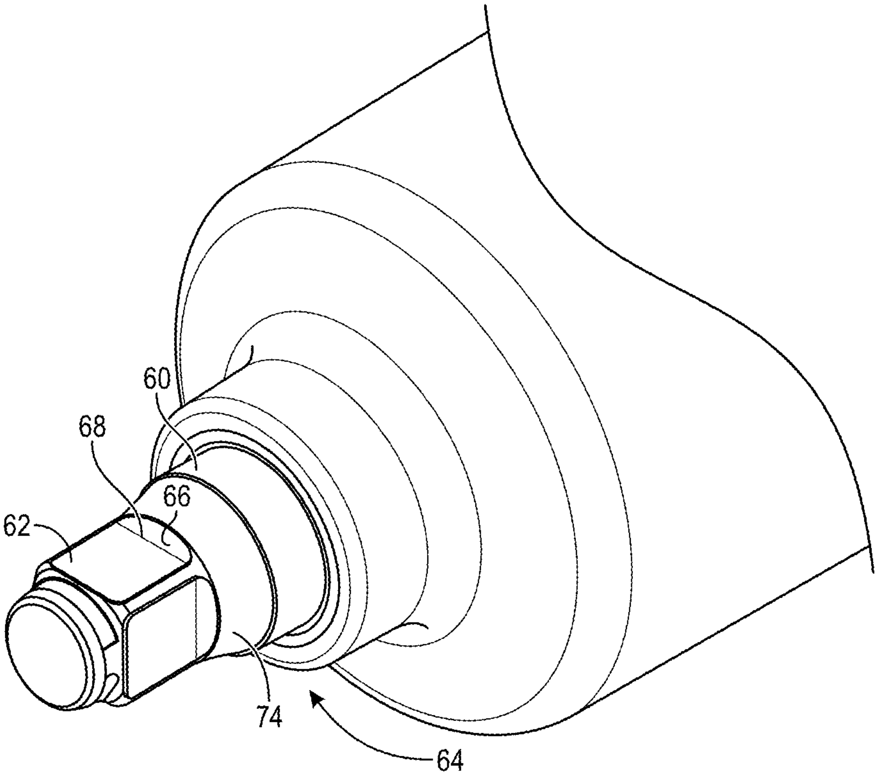
FIG. 2 is a partial isometric view of a conventional anvil for an impact tool.

FIG. 2 depicts a form of a conventional impact tool anvil which can include a cylindrical shaft portion 60 and a drive output portion/drive end 62. The impact tool anvil can include other cross sectional shapes along the length of the tool anvil which will be appreciated. The cylindrical shaft portion 60 is shaped in a cylinder so that bearings or bushings of the impact tool that cause the shaft to rotate can do so with a smooth motion. Such smooth motion can facilitate more of the force being transferred to tooling that manipulates a fastener. For example, the tooling can be an intermediate device, such as a socket configured to interface with the fastener that the operator of the impact tool desires to rotate. However, for the rotational force to be transferred to the tooling, the opposing end of the cylindrical shaft, or the drive output portion 62, is configured in a specific shape which typically includes faceted surfaces. An example shape of the faceted surfaces a square, although other shapes, such as polygons, can be used. Thus, the cylindrical shaft portion 60 is transitioned from a cylindrical shape into a shape of the drive output portion 62.

The transition from the cylindrical shaft portion 60 to the drive output portion 62 is typically achieved in a transition portion 64 having a shoulder 66 and a tapered neck 74. The shoulder 66 is typically an angled or curved surface that abruptly changes slope from the tapered neck 74 of the cylindrical shaft portion 60 to the drive output portion 62. As such, points 68 on the anvil where the drive output portion 62 meets the shoulder 66 typically define abrupt geometric changes or sharp discontinuities of slope that create potential weaknesses in the mechanical integrity of the anvil, or otherwise concentrate operational stresses on the anvil, either of which could lead to failure of the anvil over time.

Yet, conventional impact tools are purposefully designed with the shoulder 66 having sharp discontinuities of slope and abrupt changes in geometry to provide a physical shoulder 66 against which a socket may rest. For example, a socket may be inserted on the drive output portion 62, such that a user may manipulate the rotary tool to spin the drive output portion 62 and thus the socket to impart force to a work piece, such as a bolt, nut, or other fastener. Since the shoulder 66 abruptly changes geometry at the point 68, the end of the socket may rest against, or at least abut, the shoulder 66 to prevent the socket from axially advancing further up the drive output portion 62 toward the cylindrical shaft portion 60. In this way, the shoulder 66 functions to position the socket appropriately on the anvil during operation of the rotary tool. However, the sharp discontinuities of slope and abrupt changes in geometry between the drive output portion and the shoulder 66 result in high concentration of stresses on the regions of the anvil that contact the socket. The concentrated stress of these contact regions can cause the material of the anvil to yield or to develop cracks, thus weakening or damaging the anvil.

Figure 3:
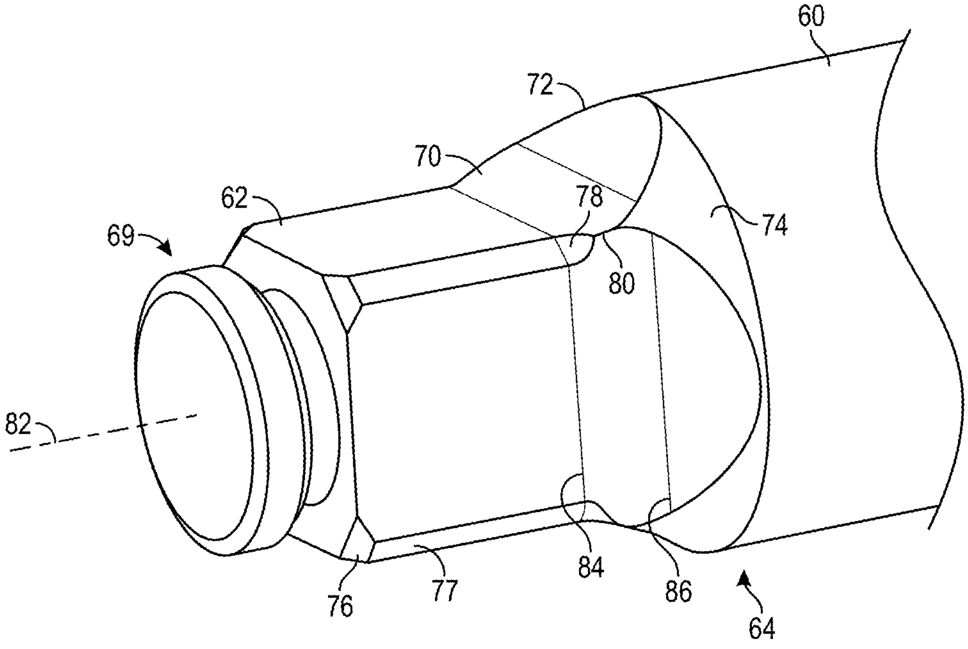
FIG. 3 is a partial perspective view of an impact tool anvil in accordance with example embodiments of the present disclosure.

FIG. 3 illustrates one embodiment of the impact tool anvil 58 of the present disclosure that manages stress incurred by the anvil 58. In implementations, the anvil 58 displaces the region of the transition between the drive output portion 62 and the cylindrical shaft portion 60 away from the region of maximum contact forces between the anvil 58 and a socket, while also reducing the stress in the transition region itself during operation by the impact tool. The impact tool anvil 58 includes a shaft portion 60, transition portion 64, and drive end 62. In the illustrated form the impact tool anvil 58 also includes a quick release 69 formed at an axial end of the drive end 62. The quick release 69 can include an annular channel circumferentially formed which is structured to receive a quick attachment fitting of a socket, however other implementations of the anvil 58 do not include the quick release 69.

The transition portion 64 includes a sweeping radius surface 70, an angular transition 72, and tapered neck 74. The transition portion 64 is configured to displace the region that is exposed to and vulnerable to high stresses, away from the region of maximum contact forces (e.g., between facets of the drive end 62 and a socket), while at the same time reducing the stress in the transition region itself. While the drive end 62 includes chamfered edges 76, the transition portion 64 can also include a stop feature 78 which provides an abutment surface for a socket when it is attached to the drive end 62. The stop feature 78 can take many forms, but in the illustrated embodiment, it is the remaining geometry of a fillet after material is removed during a step in the production of the anvil (discussed below with respect to FIG. 4 as a stress relief cut or alternatively a groove feature). It will be appreciated that not all embodiments include the stop feature 78. The stop feature 78 can provide further axial distance to relieve stresses. In the illustrated embodiment a chine feature 80 extends from the tapered neck 74 to the stop feature 78.

The sweeping radius surface 70 can take a variety of forms, and in one embodiment is in the form of a sweeping radius. The sweeping radius surface 70 can include a constant increase in structural material (e.g., cross sectional increase in material forming the anvil 58) starting from a first axial end 84 and ending at a second axial end 86 prior to transitioning to the angular transition 72. In some forms the sweeping radius surface 70 may be include a variable increase or decrease in material between the first axial end 84 and the second axial end 86. The sloping surface 70 can be joined by a tangent radius or contiguous spline to the faceted face of the drive end 62 and the angular transition 72 surface to provide a smooth transition from each of the respective faceted faces. Not all transitions need be smooth. The surface 70 can be configured to provide a gradual radial increase in material along an axis of extension 82 of the anvil 58 from the faceted shape of the drive end 62 to the cylindrical shaft portion 60. In implementations, the sweeping radius surface 70 is tangent to the flat faces of the facets and to corners between respective faces of the facets, and provides a harmonious intersection as one moves tangentially from the center of a flat to a corner. This transition design provides a smooth change in cross-sectional area at any axial position along the shaft, between the square of the drive end 62 and the cylindrical shaft portion 60.

The angular transition 72 continues from the second axial end 86 of the radius surface 70 to the shaft portion 60. In one form the angular transition 72 joins the second axial end 86 at a point of tangency of the radius surface 70 such that an abrupt transition is avoided, but not all embodiments need to be perfectly smooth. The angular transition 72 can be a sloped surface with a constant slope.

Figure 4:
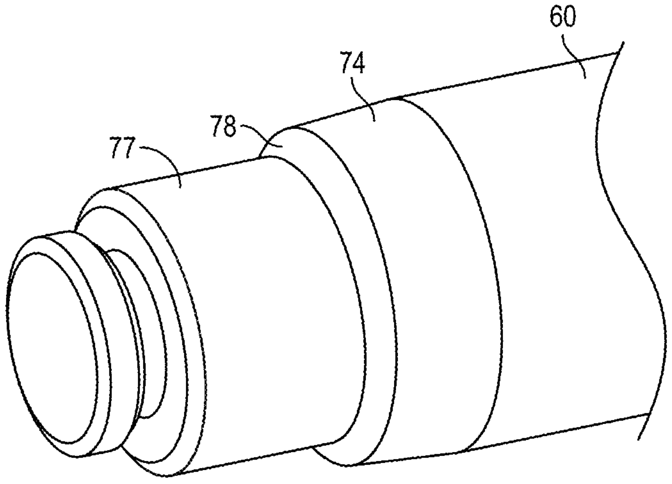
FIG. 4 is a partial perspective view of an impact tool anvil in an intermediate form during a shaping process in accordance with example embodiments of the present disclosure.

Turning now to FIG. 4, the anvil 58 is shown at one stage during a method of forming the anvil 58. The cylindrical shaft portion 60 is shown along with the tapered neck 74. The tapered neck 74 can be formed through a turning operation which is used to reduce the diameter of the stock material used for the anvil 58 from a first diameter at the shaft portion 60 to a final diameter of an outer portion 77 at the region where the faceted faces of the drive end 62 will be formed. The final radius of the tapered neck 74 corresponds to the outer portion 77 illustrated in FIGS. 3 and 4. A stress relief cut 78 can be formed at one end of the tapered neck 74 which corresponds to the stop feature 78 illustrated above. The stress relief cut 78 can take a variety of forms including an annular groove. The stop feature 78 can be located in a position which is aligned with the corners of the faceted drive end. An absence of the stress relief cut 78 can correspond to an absence of the stop feature 78. The stress relief cut 78 can be formed through a turning operation and can correspond to an annular cut having a constant radius (seen in cross section), but other forms are also contemplated. A series of operations can be performed to form the faceted faces, the radius surface 70, and the angular transition 72. Any of steps such as grinding, milling, cutting, forging, etc. can be used to form any of the surfaces.

It will be appreciated that steps used to manufacture the various portions (e.g., one or more of 70, 72, 74, 76, 78, 80, etc.) may result in relatively sharp edges. In some forms an additional step can be used to smooth any rough edges of the pre-finished anvil 58. For example, portions of the anvil 58 (e.g., one or more of 70, 72, 74, 76, 78, 80, etc.) can be subjected to a buffing process, a grinding process, or another material shaping process to smooth sharp edges associated with formation of the various portions of the anvil.

Figure 5:
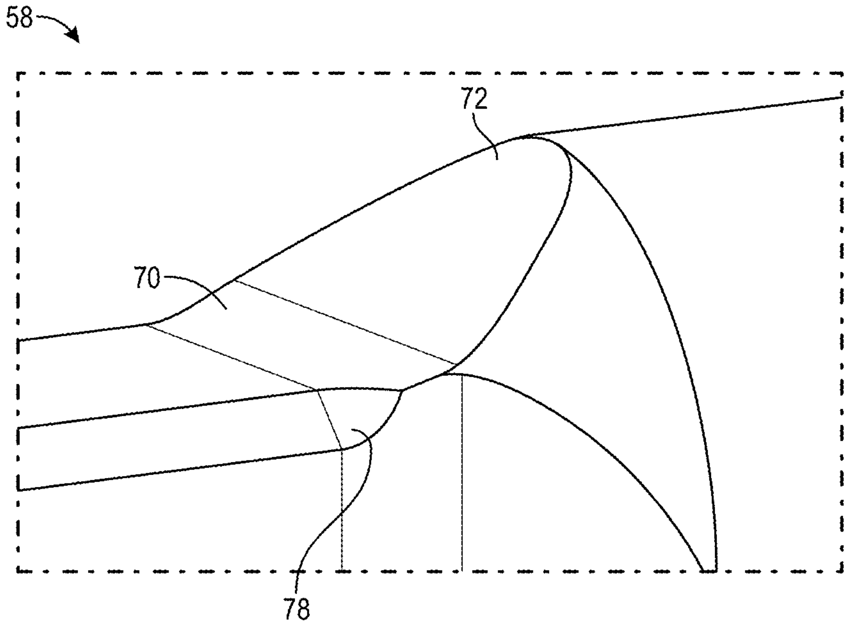
FIG. 5 is a partial perspective view of an impact tool anvil in accordance with example embodiments of the present disclosure.
Figure 6A:
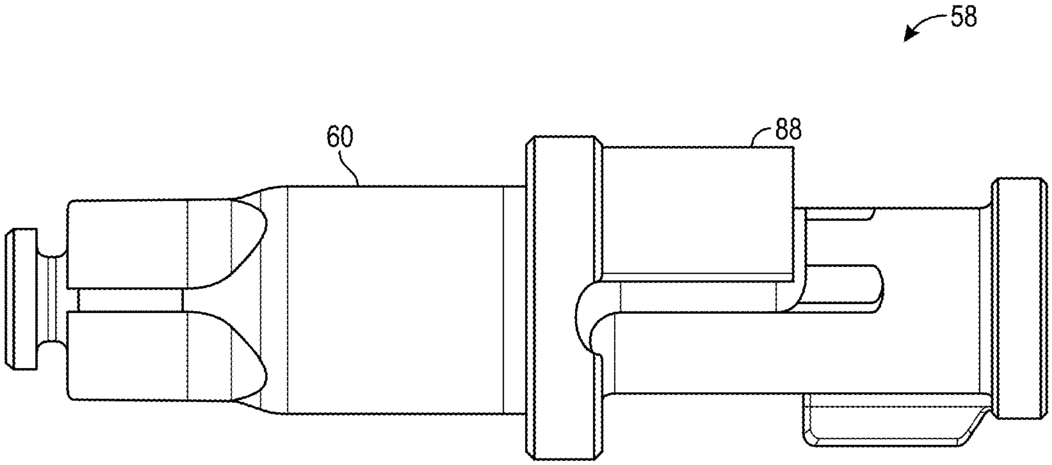
FIG. 6A is a side elevation view of an impact tool anvil in accordance with example embodiments of the present disclosure.
Figure 6B:
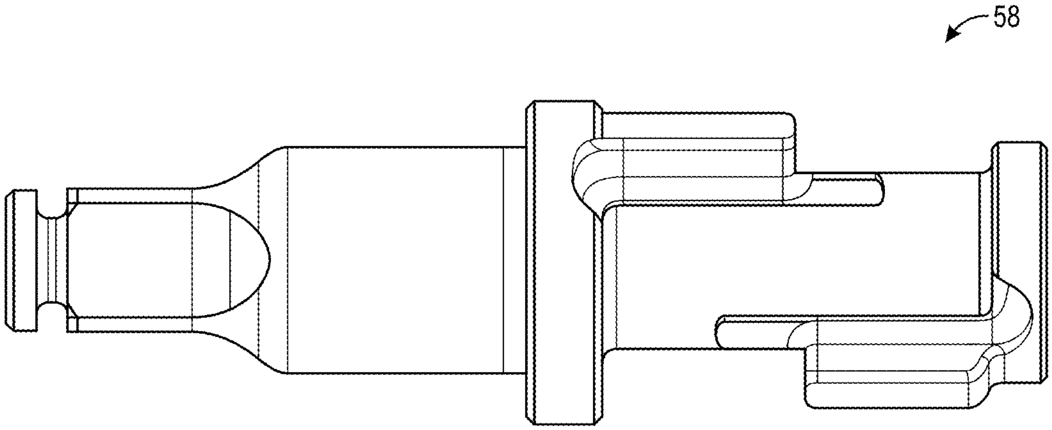
FIG. 6B is a side elevation view of the impact tool anvil of FIG. 6A, with a drive end facet shown parallel with the page.
Figure 6C:
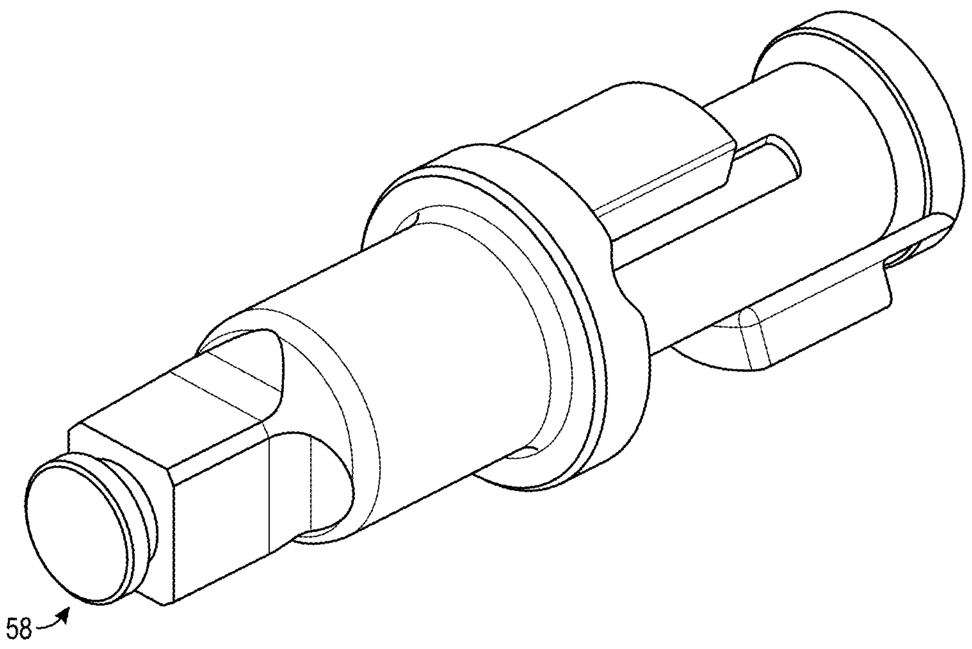
FIG. 6C is an isometric view of the impact tool anvil of FIG. 6A.
Figure 6D:
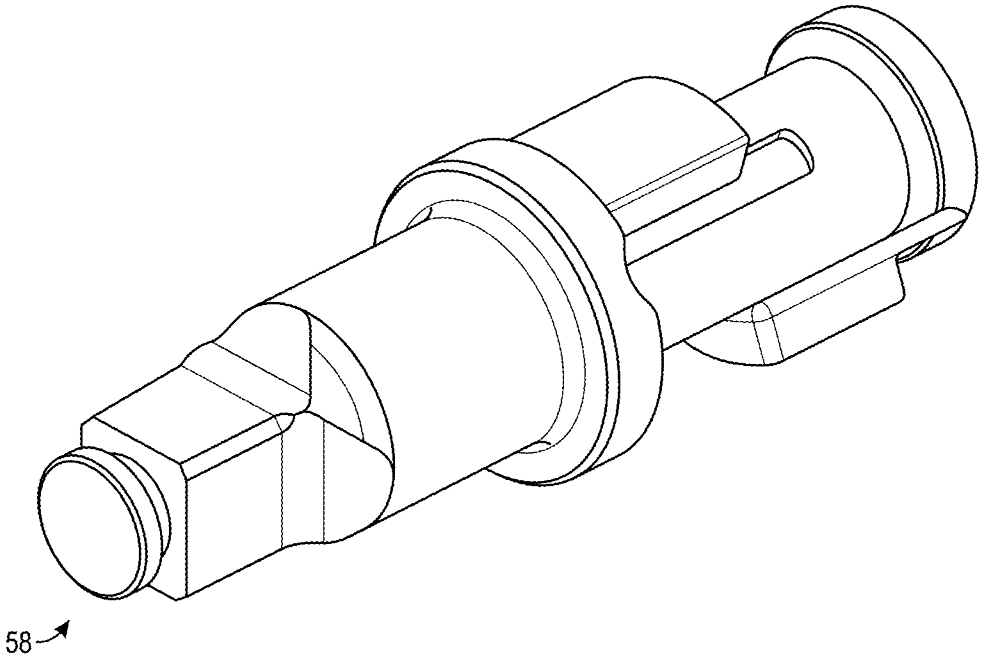
FIG. 6D is an isometric view of an impact tool anvil having a stop feature in accordance with example embodiments of the present disclosure.

FIG. 5 depicts a view of the anvil 58 showing the stop feature 78, radius surface 70, and angular transition 72 in an example implementation. Referring to FIG. 6A through 6D, example implementations of the anvil 58 are shown. The anvil 58 generally includes an anvil feature 88 aft of the cylindrical shaft portion 60 formed to receive impacting motion from a hammer 56 of the impact tool 50. For example, the motor 54 of the impact tool 50 rotates the hammer 56 within the housing of the impact tool 50, which causes the hammer 56 to periodically strike the anvil 58 at the anvil feature 88 to drive the drive output portion 62.

The anvils 58 described in accordance with the present disclosure manage the stresses associated with operation of the impact tool 50. For example, the anvils 58 manage stresses at the drive output portion 62, the transition portion 64, and at interfaces between the drive output portion 62 and the transition portion 64. In implementations, the anvils 58 described herein can provide a reduction of more than 35% in stresses at the transition portion 64 as compared to conventional-style anvils. Examples of stress management in the anvils 58 were determined through finite element analysis (FEA) of various anvil structures. Concentrated stresses were shown at the edge of each respective faceted face of the drive end 62 in the conventional style anvil of FIG. 2. In FEA of the anvil 58 without the stop feature 78 and FEA of the anvil 58 including the stop feature 78 the stressed regions of the anvils 58 demonstrated a dramatic reduction in stress at the corner of the faceted face of the drive end 62 as compared to the stress region determined in the conventional style anvil of FIG. 2, with an approximately 36% to 37% reduction in maximum stress in the anvils 58 compared to the conventional style anvil.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

While the disclosure has been illustrated and described in detail in the drawings and foregoing description, the same is to be considered as illustrative and not restrictive in character, it being understood that only example embodiments have been shown and described and that all changes and modifications that come within the spirit of the disclosure are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings.

What is claimed is:

1. An apparatus comprising:

an impact tool anvil extending along an axis of extension and having a faceted drive end and a shaft body which is connected to the faceted drive end through a transition region that couples respective faces of the faceted drive end to the shaft body, the transition region including a sweeping radius surface having a first axial end and a second axial end, the first axial end connected to a respective face of the faceted drive end, the first axial end having a tangency with the respective face of the faceted drive end;

an angular transition having a slope that radially rises from the second axial end of the sweeping radius surface to the shaft body;

a tapered neck extending from the shaft body towards the first axial end, the tapered neck longitudinally adjacent to the angular transition and a portion of the sweeping radius surface;

a stop feature configured to halt axial motion towards the shaft body by a socket positioned onto at least a portion of the faceted drive end, the stop feature sharing a first edge with the sweeping radius surface axially adjacent the first axial end; and a chine feature extending from the tapered neck to the stop feature and defining a second edge extending between the tapered neck and the stop feature.

2. The apparatus of claim 1, wherein the faceted drive end has a square drive shape.

3. The apparatus of claim 1, wherein the shaft body is defined by a circular cross sectional shape.

4. The apparatus of claim 1, wherein the slope of the angular transition is a constant slope.

5. The apparatus of claim 1, wherein the sweeping radius surface includes a cross sectional increase in material from the first axial end to the second axial end.

6. The apparatus of claim 1, wherein the stop feature is aligned with respective corners at an intersection of the respective faces of the faceted drive end.

7. The apparatus of claim 1, wherein the impact tool anvil is coupled with a power tool, the impact tool anvil located within the power tool.

8. The apparatus of claim 7, wherein the power tool is one of an electric corded power tool, an electric cordless power tool, a hydraulic power tool, and a pneumatic power tool.

9. The apparatus of claim 7, further comprising a motor and a hammer each disposed within the power tool, the motor configured to drive the hammer, the hammer configured to deliver a force to the impact tool anvil upon being driven by the motor.

* * * * *